June 12, 1951  D. P. ECKMAN  2,556,803
FLOW INTEGRATING METER
Filed Dec. 20, 1944
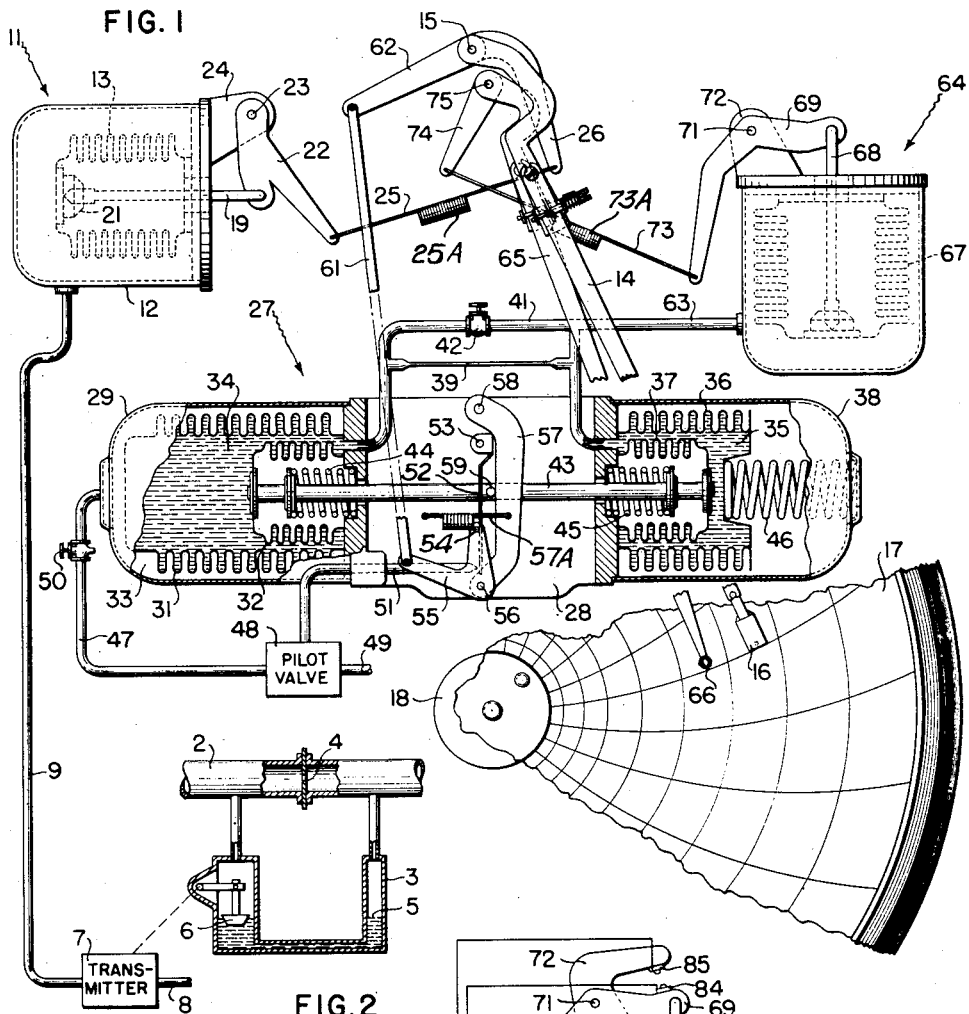
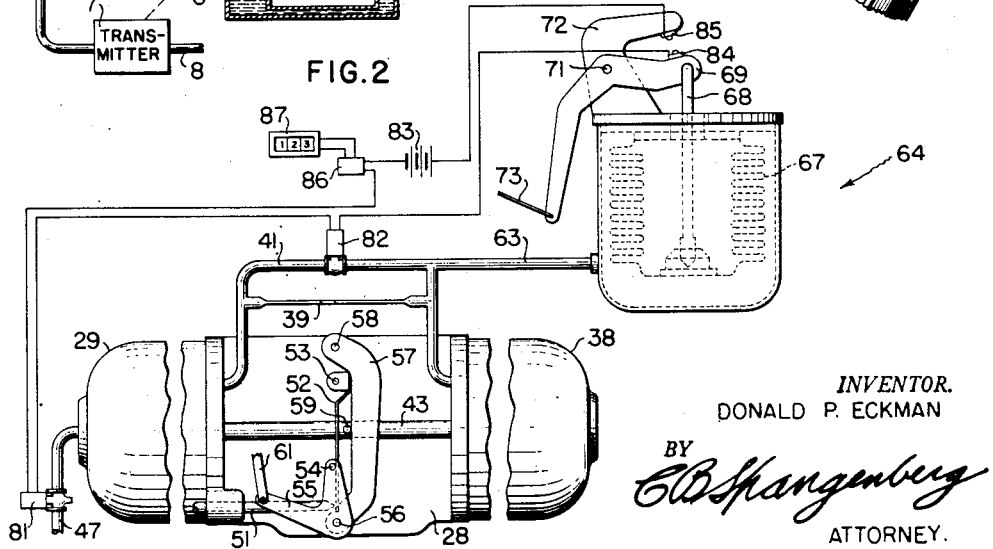
INVENTOR.
DONALD P. ECKMAN
BY C. D. Spangenberg
ATTORNEY.

Patented June 12, 1951

2,556,803

UNITED STATES PATENT OFFICE 2,556,803

FLOW INTEGRATING METER

Donald P. Eckman, Philadelphia, Pa., assignor, by mesne assignments, to Minneapolis-Honeywell Regulator Company, Minneapolis, Minn., a corporation of Delaware Application December 20, 1944, Serial No. 568,962

8 Claims. (Cl. 73—206)

The present invention relates to integrators, and more particularly to integrators which may be used with flow meters, to totalize continuously the amount of liquid that flows past a given point within a given time.

It has been standard practice for a number of years to use integrators with flow meters to totalize the flow measured by the instrument. Most of the integrators in use, however, are of the mechanical type that are intermittent in operation. In many places such integrators are entirely satisfactory even though they only add the instantaneous flow at periodic intervals. In some cases, and particularly where the flow is subject to large and irregular fluctuations, the periodically operating integrators are not satisfactory because they fail to respond to fluctuations that occur between their periods of operation.

The present invention has as an object thereof to provide an integrator that is continuous in operation. To this end, there is provided an instrument that operates to set up a pressure that is proportional to the flow being measured and that varies continuously with variations in the flow. This pressure is also continuously varied in accordance with time. Therefore since both flow and time are used to produce the pressure, this pressure is proportional to the total flow for a given time. The pressure is used to actuate a recording device and the position of the recording device at any given instant accordingly indicates the total flow from the beginning of a period of time to that instant.

It is a further object of the invention to provide an integrator which will integrate the total flow over a period of time, and one that may be either automatically or manually reset at the end of each period. A counter may be provided to indicate the total number of periods through which the integrator has operated.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 1 is a view, partly in section, of one embodiment of the invention, and

Figure 2 is a view showing a modification of the invention disclosed in Figure 1.

Referring to Figure 1 there is shown a pipe 2 through which the liquid to be measured and integrated is flowing. The liquid flow is measured by means of a manometer 3 that is responsive to the differential pressure produced by the flowing liquid across an orifice plate 4 which is located in the pipe. The manometer is provided with a supply of mercury 5 whose level changes as the differential pressure across the orifice 4 varies. Located in one leg of the manometer is a float 6 that moves up and down as the level of the liquid changes and which float serves to operate a pneumatic transmitter 7 that may be of the type disclosed in Patent 2,311,853 granted to Coleman B. Moore on February 23, 1943. The details of the transmitter form no part of the present invention, but it may be said that air is supplied to the transmitter at a constant pressure through a pipe 8 and the transmitter serves to set up an air pressure in pipe 9 which is proportional to the flow of liquid through the pipe 2 as measured by the height of float 6.

The pressure in pipe 9 is supplied to a receiving unit 11 that includes a chamber formed by a cup-shaped member 12 and a bellows 13, the arrangement being such that the bellows expands and contracts proportionately to the pressure changes applied by pipe 9 to this chamber. Changes in length of the bellows 13 serve to move a pen arm 14 around its pivot 15. The lower end of the pen arm has a pen 16 attached to it which pen moves across a chart 17 that is driven at any suitable speed, but usually one revolution in twenty-four hours, by a clock-driven chart hub 18. The connection between the bellows 13 and the pen arm 14 comprises a bellows link 19 which has one end received by a socket 21 attached to the bellows end wall and has its other end fastened to one arm of a bellcrank lever 22. This bellcrank lever is pivoted at 23 to a support 24 extending from the head of the receiver. The second arm of the bellcrank lever is connected by a link 25 to one end of an arm 26 that is also attached to the shaft 15 to move that shaft and the pen arm. Link 25 contains a helically coiled spring 25A.

The integrating unit is shown generally at 27. This unit consists of a support 28 which has two upstanding portions formed on it. Fastened to the left portion is a cup-shaped member 29, a large bellows 31, and a small bellows 32. The cup and large bellows form between them an air chamber 33 while the two bellows form between them a chamber 34 that is filled with liquid and which is connected to a similar chamber 35 formed by bellows 36 and 37 which are fastened to the right hand upstanding portion of the bracket 28. The large bellows 36 is protected by a cup-shaped member 38 that is also attached to the bracket 28 and which is provided with an opening so that the exterior of the bellows 36 is subjected to atmospheric pressure. The chambers 34 and 35 are connected by a capillary tube 39 and by a pipe 41 which has a manually operated valve 42 located in it. The small bellows 32 and 37 are connected so that they move together by means of a rod 43 which is suitably attached to the bellows end walls and extends through openings provided in the upstanding portions of the bracket 28. Each of the small bellows is biased to some normal length by means of springs 44 and 45 respectively so that there is at all times a force tending to move the rod 43 to a given normal, mid-position. It is noted that the large bellows 36 is compressed by a spring 46 for a purpose which will be brought out below.

Air pressure is applied to the chamber 33 through a pipe 47 and a three-way valve 50 that can connect chamber 33 with atmosphere or a pilot valve 48 which may take the form of the pilot valve disclosed in Patent 2,303,891 granted to Coleman B. Moore on December 1, 1942. The pilot valve is supplied with air under a regulated pressure through pipe 49 and is so arranged that the pressure in a nozzle line 51 is amplified and supplied to the pipe 47. Normally air escapes through the nozzle line 51 and the back pressure in this line serves to actuate the pilot valve. The escape of air through the nozzle and therefore the pressure in the pipe 51 is varied by means of a flapper valve 52 that is pivoted at 53 on the bracket 28. The flapper valve is normally biased toward the nozzle 51 to restrict the flow therethrough but may be moved to the right by means of a pin 54 that is mounted on an actuating lever 55 which is in turn pivoted at 56. The pivot 56 for the lever 55 is formed on the lower end of a lever 57 that is pivoted at 58 to the bracket 28. The lever 57 is biased in a clockwise direction by any suitable means, such as a spring 57A, into engagement with a pin 59 that projects from one side of rod 43. It will be seen that the lever 55 may be operated to move the pin 54 toward or away from the flapper 52 by means of a link 61 that has one end pivoted to the lever 55 and that has its other end pivoted to an arm 62 which is attached to and projects from the pen shaft 15.

The liquid filled system of chambers 34 and 35 is connected to a conventional pressure responsive device shown herein as a second receiving unit 64 that is similar to the receiving unit 11. This is accomplished by having the chamber formed in the receiving unit between its outer shell and a bellows 67 connected to pipe 41 to the right of valve 42 and capillary 39 by means of a pipe 63. It should be noted that the bellows 67 is made larger than bellows 13 to keep the volume of the chamber of unit 64 as small as possible. As the bellows 67 in the receiver 64 varies in length due to changes in pressure, it serves to move a second pen arm 65 having a pen 66 attached to its lower end. This is done by means of a bellows link 68, one end of which engages a socket in the end wall of the bellows 67 and the other end of which is pivoted to one arm of a bellcrank 69 that is in turn pivoted at 71 on a supporting member 72. The second arm of the bellcrank 69 is connected by means of a link 73 to the lower end of an arm 74 which is attached to a shaft 75 to which the pen arm 65 is also attached. Link 73 contains a helically coiled spring 73A.

The parts of the integrating unit are preferably so proportioned that when the flow through the pipe 2 is zero, the pen 16 will be at the zero calibration mark on the chart 17 and the lever 55 will be moved to such a position that the flapper is adjusted relative to nozzle 51 so that the pilot valve 48 will set up a minimum pressure in the chamber 33. When the flow increases to its maximum value, the pressure in the chamber 33 will have been increased to a maximum. The minimum pressure in chamber 33 is balanced by means of the spring 46 so that when this minimum pressure occurs, there will be no relative movement of the parts. As the pressure in chamber 33 increases, however, the bellows rod 43 will be moved to the right as the bellows 31 and 32 are contracted and bellows 36 and 37 are expanded against the force of the spring 46. It is also noted that the capillary 39 is of such a length and diameter that a predetermined amount of liquid can flow through it from one chamber to the other in a predetermined time. Preferably the tube will be of such a size that the total amount of liquid in chamber 34 may flow through the capillary to chamber 35 in a period of time approximately equal to the time required for one rotation of the chart 17.

In the operation of the device variations in the flow of fluid through the pipe 2 will produce changes in the level of the mercury 5 of the manometer 3 to raise or lower float 6. These changes are set up by the transmitter 7 in a known manner as variations in the air pressure applied through the pipe 9 to the receiver 11. The arrangement is such that the air pressure produced by the transmitter 7 is proportional to the flow through pipe 2. The bellows 13 of the receiver responds to these variations in pressure and acts through the levers connected therewith to move pen 16 across chart 17. Thus a record is made on the chart of the instantaneous value of the flow.

The movements imparted to the bellows 13 are transferred through link 61, lever 55, and pin 54 to the flapper 52. If the flow is zero the flapper will be so positioned relative to nozzle 51 that a minimum pressure is produced by pilot valve 48 and applied to the chamber 33. Usually, however, there will be a flow through the pipe 2 so that the pilot valve will be producing a pressure above the minimum. When pressure is applied to the chamber 33 it will act through bellows 31 and 32 and the liquid contained in chamber 34 to move rod 43 to the right. This gives a follow-up movement to the flapper or a movement thereof in a reverse direction to the original movement. Since the rod 43 was moved to the right, pin 59 on that rod will engage the side of lever 57 carrying the flapper actuating lever 55 and shift them to the right, thus moving the flapper away from the nozzle.

While the above operation is taking place, and when there is any flow through the pipe 2, the pressure in chamber 33 on the exterior of bellows 31 will be greater than the pressure of the atmosphere and the spring 46 on the exterior of bellows 36. Consequently the rod 43 will be moved to the right out of its normal, mid-position. Since the rod is biased to its mid-position by the natural resiliency of bellows 32 and 37 and springs 44 and 45, the rod 43 will accordingly tend to return to the left, and will do so at a rate depending upon the speed with which the liquid can flow through the capillary 39 from the high pressure chamber 34 to the low pressure chamber 35, the valve 42 being closed. The flow of liquid through the capillary 39 will, of course, vary with the pressure variations in chamber 33.

The movement of rod 43 to the left will permit flapper 52 to move slowly and continuously toward nozzle 51. As this occurs there will be a steady increase in pressure produced by the pilot valve 48 added to that produced by changes in flow. As long as there is any air pressure in the chamber 33 above the minimum, the rod 43 will be forced out of its mid-position. Therefore it will continue to move toward the left to force liquid out of the chamber 34 into chamber 35 and receiver 64. Inasmuch as the same liquid pressure is applied to the receiver as is applied in the chamber 35, bellows 67 will collapse as the liquid is forced to the right past capillary 39. As the bellows 67 collapses, pen 66 will be moved outwardly across chart 17 to indicate the total flow that has passed through the pipe 2 during the time the instrument is in operation. Therefore the position of the pen 66 at any given time is an indication of the total flow through the pipe 2 from the time that the instrument was started until that given time. The chart 17 may be so calibrated that the total flow may be read in units of volume as well as the instantaneous flow as indicated by pen 16.

In the operation of the device, the greater the flow, the more pressure there will be on the liquid in chamber 34 and the faster the liquid will be forced from that chamber. If the flow should fall off to zero, the pressures in the system will be equalized so that the rod 43 will return to its mid-position and stay there. At this time no liquid will be flowing from chamber 34 so that pen 66 will remain at rest at the same position across the chart.

Each time the liquid has been completely forced out of the chamber 34 and the pen 66 has been moved to its maximum position on the chart, or in some shorter period, the integrating unit must be reset. This is accomplished by simultaneously opening valve 42 and adjusting valve 50 to connect chamber 33 with the atmosphere. When this is done, liquid will be quickly forced by spring 46 and bellows 67 into chamber 34, and the pen 66 will return to its zero position on the chart. Thereafter closing valve 42 and readjusting valve 50 will place the instrument in condition to operate again. Preferably the valves 42 and 50 will be made to be operated together.

As was mentioned above the capillary 39 is of such a size that the liquid from chamber 34 may leak through it during the time the chart 17 makes one complete revolution. This is for convenience only since it means that if the flow through pipe 2 is a maximum that the pen 66 will move from zero to maximum on the chart for one revolution thereof. Usually charts are rotated once every twenty-four hours and are changed daily. At the time the operator changes the chart he will also reset the integrating unit. The record line of pen 66 would then give the total flow for each recording period.

In some cases it might be desirable to operate the valves 42 and 50 automatically when all of the liquid has been expelled from chamber 34. A system for accomplishing this is shown in Figure 2 of the drawing.

This is accomplished by placing a solenoid operated valve 81 in the pipe 47 in place of the hand operated valve 50 that was disclosed in Figure 1 of the drawing and placing a solenoid operated valve 82 in the pipe 41. The valves 81 and 82 are energized to reset the instrument, when all of the liquid has been forced out of chamber 34. This is accomplished by connecting the energizing solenoids of these valves in circuit with a battery 83 and a pair of contacts 84 and 85 that are closed when the bellows 67 of the receiver 64 has been contracted to its minimum length. The contact 84 is mounted on one arm of the bellcrank 69 and engages the contact 85 which is mounted on a stationary extension of the support 72. The parts are so made that these contacts will engage to energize the solenoid when the pen 66 has moved to its maximum position across the chart.

Also in this electrical circuit is a solenoid 86 that is used to operate a counter 87. The counter is provided to show the number of times that the system has been returned to neutral in order that an operator may determine the total flow passing through the pipe. If, for instance, the chart were rotated at a rate of one revolution a week, the pen 66 would probably be moved to its maximum positions several times during the course of the week. It would, therefore, be desirable to know at a glance how many times the system was returned to neutral so that the proper multiplying factor could be obtained to be used with the chart in determining the total flow. The counter 87 will give this information.

From the above description it will be seen that I have provided an integrator mechanism which is simple and continuous in operation and one which makes a record that can be read to give the instantaneous flow as well as the total flow over a period of time.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In an integrating instrument, a liquid filled system including a pair of oppositely disposed expansible chambers each having a plurality of expansible walls, a restricted connection between said chambers, a rigid member extending between and attached to one wall of each of said chambers, means to bias said member to a normal position, mechanism to apply an air pressure varying with the flow of a fluid to one of said chambers, said pressure causing said chamber to collapse and move said member out of its normal position, said biasing means slowly returning said member as liquid leaks through said restricted connection, means operated by said member and including a portion of said mechanism operative to also adjust said air pressure to increase the same continuously as said liquid leaks through said restricted connection, a third expansible liquid filled chamber, connected with the second of said previously mentioned chambers operative to change in size as liquid is forced from said one of said chambers, indicating means, and means operated as said third chamber varies in size to move said indicating means.

2. In an integrating instrument, a pair of expansible fluid filled chambers each having walls, a restricted connection between said chambers through which the fluid may flow from one chamber to the other, means to apply a pressure varying with the flow of a fluid through a pipe to said first chamber, a member connected to a wall of each chamber, means to resiliently force said member to a given position, the application of said pressure and said resilient force applied to said first chamber forcing fluid from the same at a rate determined by said pressure and the size of said restricted connection, mechanism operated by said member and including a portion of said first means to apply an additional pressure to said first chamber in response to movements of said member, a third expansible, fluid filled chamber directly connected with said second chamber, an exhibiting element, and means to move said element by a movable wall of said third chamber as fluid is forced from said first chamber into said second and third chambers.

3. In an integrating instrument, a fluid-filled system including a plurality of expansible chambers, a restricted connection between one of said chambers and the remainder thereof, means to apply a pressure varying in fixed relation to the flow of a fluid in a pipe to said one of said chambers to force fluid from said one of said chambers into the remainder thereof at a rate dependent upon the value of said pressure and the size of said restricted connection, means to modify said pressure in accordance with the fluid flowing through said restricted connection to one of said remaining chambers, an exhibiting element, and means to move said exhibiting element in accordance with the flow of fluid through said restricted connection to another of said remaining chambers.

4. In an integrator having a measuring instrument responsive to changes in a variable to be integrated, the combination; including, a liquid-filled chamber of variable capacity, a restricted conduit forming a passage for liquid flowing in response to changes in the capacity of said chamber and having a cross section which permits the flow of the total amount of the fluid used to perform the integration in the time during which the integration takes place, means having a normal position and movable by said measuring instrument out of said normal position so as to apply pressure to said chamber and to vary the capacity of said chamber in proportion to each instantaneous deviation from a normal value sensed by said measuring instrument, second means having a normal position and movable out of said normal position upon a change of capacity of said chamber and, when out of normal position, moving said first mentioned means in the direction opposite to that in which said first mentioned means is moved in response to the measuring instrument so as to stabilize said pressure applied to said chamber, and liquid-operated exhibiting means operated by the liquid which has flowed through said restricted conduit to exhibit the integral of said instantaneous deviations from the normal value.

5. In an integrator having a measuring element responsive to changes in a variable to be integrated, the combination including, a liquid-filled chamber of variable capacity, a valve controlling the application of pressure to said chamber so as to vary the capacity thereof, a restricted conduit through which liquid flows in response to changes in the capacity of said chamber at a rate which, at maximum, permits the flow of the total amount of liquid used to perform the integration in the time during which the integration takes place, a mechanical linkage driven by said measuring element to move said valve in one direction or the other to vary said pressure in proportion to each instantaneous value sensed by said measuring element, a rod actuated by changes in the capacity of said chamber to move said valve in the opposite direction to that in which said valve is moved by said measuring element so as to stabilize said pressure applied to said chamber, a spring driven by said rod so as to store energy in the spring during the pressure-actuated movement of said rod and expending this stored energy to apply pressure to said chamber so as to cause a flow of liquid relative to said chamber during times at which the pressure applied to said chamber is less than the pressure applied to said chamber by said spring, a liquid-pressure-response device receiving and operated by liquid which has flowed through said conduit, and an indicator operated by said device for indicating the integral of the instantaneous values.

6. In an integrating instrument, means to set up an air-pressure varying in fixed relation with the flow of a fluid through a pipe, a liquid-filled chamber of variable size, a liquid-conveying conduit communicating with said chamber and of such size with respect to the volume of said chamber that over its integrating range of operation liquid is displaced with respect to said chamber at a rate proportional to the value of the flow of fluid through the pipe by the application of said pressure to said chamber to vary the size of said chamber, an indicating element, and means to move said element, which means communicate with said conduit and are operated by the liquid conveyed through said conduit as said chamber changes in size.

7. An integrator for recording the summation over a period of time of a plurality of instantaneous deviations from an initial value as sensed by a measuring instrument, said integrator including, a liquid-filled chamber having a variable volume, an air-operated device controlling the application of pressure to said liquid-filled chamber to vary the volume of said chamber whenever said measuring instrument deviates from initial position, a spring stressed by movement due to the variation in volume of said chamber so as to store energy in said spring, the energy of said spring applying stress to said chamber so as to continue to vary its volume when the pressure applied to said chamber by said device ceases to vary, a restricted conduit communicating with said chamber and constructed and arranged so that a variation in the volume of said chamber causes a flow of liquid through said conduit and with respect to said chamber at a rate related to the instantaneous value of said deviation, the size of said conduit being proportioned to the size of said chamber so that at the maximum rate of flow of liquid through said conduit the total volume of liquid available passes during the time in which the integration takes place, a motor operated by the liquid which has flowed through said restricted conduit, and exhibiting means driven by said motor to exhibit the integral of the instantaneous values of said deviation.

8. An integrator for recording the summation over a period of time of a plurality of instantaneous deviations from an initial value as sensed by a measuring instrument, said integrator including, a liquid-filled chamber having a variable volume, an air-operated device controlling the application of pressure to said liquid-filled chamber to vary the volume of said chamber whenever the measuring instrument deviates from initial position, a spring stressed by the movements caused by variation in volume of said chamber so as to store energy in said spring, the energy stored in said spring stressing said chamber to cause variations in the volume of said chamber when the pressure applied to said chamber by said device has ceased to change, an indicator operated by said device to indicate the instantaneous value sensed by the measuring instrument, a restricted conduit communicating with said chamber and constructed and arranged so that a variation in the volume of said chamber causes a flow of liquid through said conduit and with respect to said chamber at a rate related to the instantaneous value of said deviation, the size of said conduit being proportioned to the size of said chamber so that at the maximum rate of flow of liquid through said conduit the total volume of liquid available passes during the time in which the integration takes place, a motor operated by the liquid which has flowed through the restricted conduit, and exhibiting means driven by said motor to exhibit the integral of the instantaneous value of said deviations.

DONALD P. ECKMAN.

REFERENCES CITED

The following references are of record in the file of this patent:

UNITED STATES PATENTS

| Number | Name | Date |
|---|---|---|
| Re. 18,514 | Reeves | July 5, 1932 |
| 967,953 | Morris | Aug. 23, 1910 |
| 2,125,031 | Moore | July 26, 1938 |
| 2,243,944 | Donaldson | June 3, 1941 |
| 2,290,125 | Donaldson | July 14, 1942 |
| 2,306,142 | Semet | Dec. 22, 1942 |
| 2,311,853 | Moore | Feb. 23, 1943 |
| 2,352,312 | Donaldson | June 27, 1944 |